US012587869B2

(12) United States Patent
Li et al.

(10) Patent No.: US 12,587,869 B2
(45) Date of Patent: Mar. 24, 2026

(54) METHODS PERFORMED BY RECEIVER AND TRANSMITTER IN COMMUNICATION SYSTEM AND DEVICES

(71) Applicant: Samsung Electronics Co., Ltd., Gyeonggi-do (KR)

(72) Inventors: Pengru Li, Beijing (CN); Qi Xiong, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 18/137,687

(22) Filed: Apr. 21, 2023

(65) Prior Publication Data

US 2023/0345261 A1      Oct. 26, 2023

(30) Foreign Application Priority Data

Apr. 24, 2022    (CN) .......................... 202210436012.3

(51) Int. Cl.
*H04W 16/28*      (2009.01)
*H04L 5/00*       (2006.01)
*H04W 24/10*      (2009.01)

(52) U.S. Cl.
CPC ........... *H04W 16/28* (2013.01); *H04L 5/0051* (2013.01); *H04W 24/10* (2013.01)

(58) Field of Classification Search
CPC .............................. H04L 5/0051; H04W 24/10
See application file for complete search history.

(56) References Cited

U.S. PATENT DOCUMENTS

| | | | |
|---|---|---|---|
| 2020/0408871 A1 | 12/2020 | Da et al. | |
| 2022/0039053 A1 | 2/2022 | Edge et al. | |
| 2022/0043099 A1 | 2/2022 | Da et al. | |
| 2024/0205877 A1* | 6/2024 | Ernström | .............. H04L 5/0051 |
| 2024/0345201 A1* | 10/2024 | Peng | ...................... G01S 5/0036 |
| 2024/0407047 A1* | 12/2024 | Lee | ........................ H04L 5/0048 |
| 2025/0151010 A1* | 5/2025 | Hoang | .................. H04L 5/0051 |

FOREIGN PATENT DOCUMENTS

| | | |
|---|---|---|
| EP | 3 944 680 | 1/2022 |
| KR | 10-2307426 | 9/2021 |

OTHER PUBLICATIONS

Zhenyu Zhang et al., "High Precision Positioning Algorithm Based on Carrier Phase and Time of Arrival", IET Communications, vol. 15, Issue 20, Nov. 11, 2021, 3 pages.
International Search Report dated Jul. 14, 2023 issued in counterpart application No. PCT/KR2023/005256, 8 pages.

* cited by examiner

*Primary Examiner* — Derrick V Rose
(74) *Attorney, Agent, or Firm* — The Farrell Law Firm, P.C.

(57) ABSTRACT

The disclosure relates to a 5G or 6G communication system for supporting a higher data transmission rate. Methods and devices are provided in a communication system. A method performed by a transmitter in a communication system. Configuration information of a reference signal for carrier phase-based positioning is transmitted to a receiver. The reference signal for carrier phase-based positioning is transmitted to the receiver. A measurement result that is based on the reference signal for carrier phase-based positioning is received from the receiver.

16 Claims, 6 Drawing Sheets

METHODS PERFORMED BY RECEIVER AND TRANSMITTER IN COMMUNICATION SYSTEM AND DEVICES

CROSS-REFERENCE TO RELATED APPLICATION(S)

This application is based on and claims priority under 35 U.S.C. § 119 to Chinese Patent Application No. 202210436012.3, filed on Apr. 24, 2022, in the CNIPA, the disclosure of which is incorporated by reference herein in its entirety.

TECHNICAL FIELD

The present application relates generally to the field of communications, and more particularly, to carrier phase-based positioning in a communication system.

BACKGROUND $5^{th}$ generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, implementation of $6^{th}$ generation (6G) mobile communication technologies (also referred to as beyond 5G systems) in terahertz bands (e.g., 95 GHz to 3 THz bands) has been considered in order to achieve transmission rates fifty times faster than 5G mobile communication technologies and ultra-low latencies one-tenth of 5G mobile communication technologies.

When the development of 5G mobile communication technologies began, in order to support services and to satisfy performance requirements in connection with enhanced mobile broadband (eMBB), ultra reliable low latency communications (URLLC), and massive machine-type communications (mMTC), there was ongoing standardization regarding beamforming and massive multiple input-multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (WPC) code for large amount of data transmission and a polar code for highly reliable transmission of control information, layer (L2) pre-processing, and network slicing for providing a dedicated network specialized to a specific service.

Currently, there are discussions regarding improvement and performance enhancement of initial 5G mobile communication technologies in view of services to be supported by 5G mobile communication technologies, and there has been physical layer standardization regarding technologies, such as vehicle-to-everything (V2X), for aiding driving determination by autonomous vehicles based on information regarding positions and states of vehicles transmitted by the vehicles and for enhancing user convenience, new radio-unlicensed (NR-U) aimed at system operations conforming to various regulation-related requirements in unlicensed bands, new radio (NR) user equipment (UE) power saving, non-terrestrial network (NTN), which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional-MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an aspect of the disclosure, a method is provided that is performed by a transmitter in a communication system. The method may include transmitting configuration information of a reference signal for carrier phase-based positioning to a receiver, transmitting the reference signal for carrier phase-based positioning to the receiver, and receiving, from the receiver, a measurement result that is based on the reference signal for carrier phase-based positioning.

According to another aspect of the present disclosure, a method is provided that is performed by a receiver in the communication system. The method may include receiving, from a transmitter, configuration information of a reference signal for carrier phase-based position, receiving, from the transmitter, the reference signal for carrier phase-based positioning; performing a carrier phase-based positioning measurement on the reference signal for carrier phase-based positioning, and transmitting a measurement result of the carrier phase-based positioning measurement to the transmitter.

According to another aspect of the disclosure, a transmitter device is provided. The transmitter device may include a transceiver, and a processor that is coupled to the transceiver. The processor is configured to transmit, to a receiver, configuration information of a reference signal for carrier phase-based positioning, transmit, to the receiver, the reference signal for carrier phase-based positioning, and receive, from the receiver, a measurement result that is based on the reference signal for carrier phase-based positioning.

According to another aspect of the present disclosure, a receiver device is provided. The receiver device may include a transceiver, and a processor that is coupled to the transceiver. The processor is configured to receive, from a transmitter, configuration information of a reference signal for carrier phase-based positioning, receive, from the transmitter, the reference signal for carrier phase-based positioning, perform a carrier phase-based positioning measurement on the reference signal for the carrier phase-based positioning, and transmit, to the transmitter, a measurement result of the carrier phase-based positioning measurement.

According to another aspect of the present disclosure, there is also provided a non-transitory computer-readable medium storing instructions thereon, when executed by a processor, cause the processor to perform the method described above.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1:
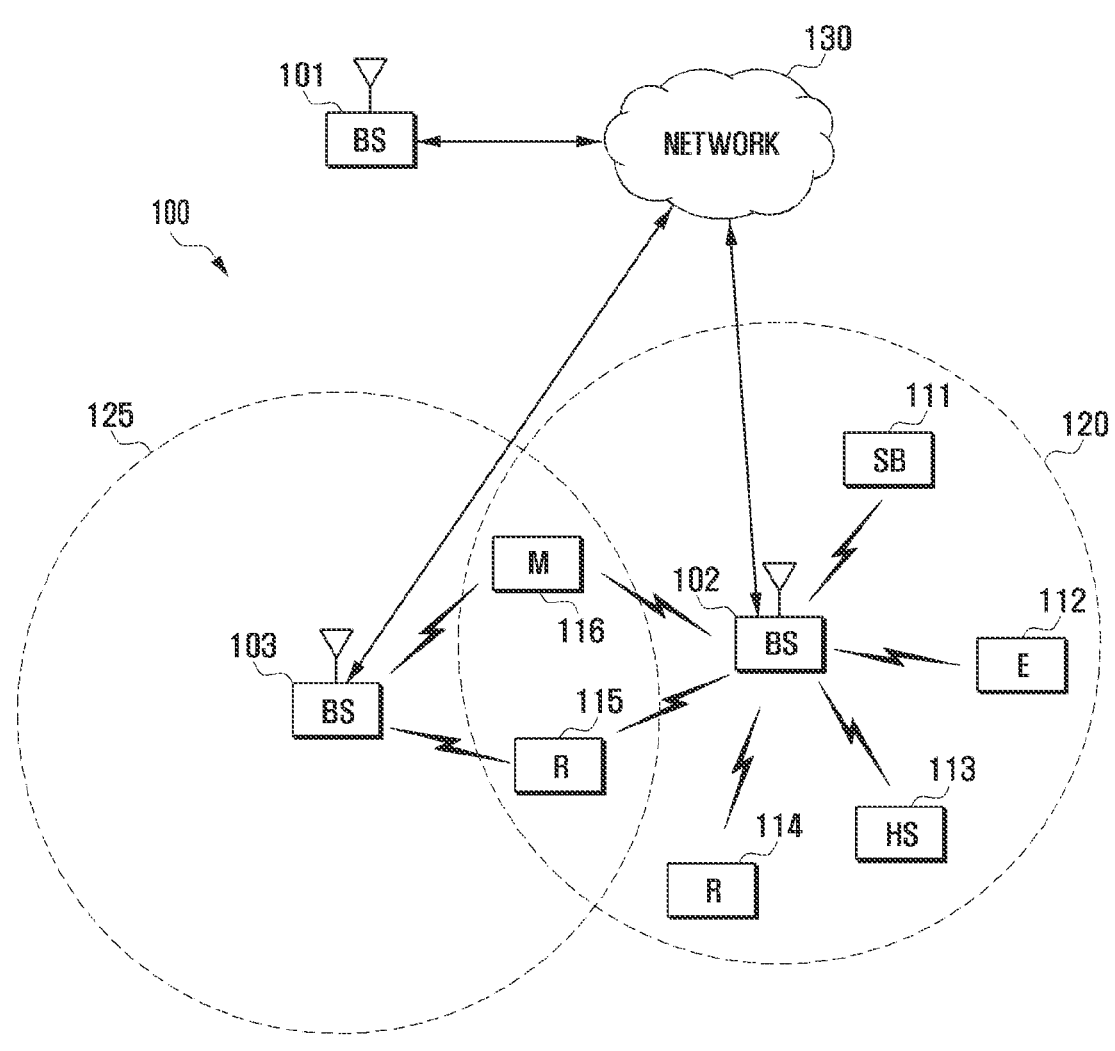
FIG. 1 is a diagram illustrating a wireless network, according to an embodiment of the disclosure.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

The disclosure includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B. The term "and/or" used in various embodiments of the present disclosure includes any or all of combinations of listed words. For example, the expression "A and/or B" may include A, may include B, or may include both A and B. For the sake of clarity, the expression "/" is used to represent the relation of "and/or" in various embodiments of the present disclosure.

Unless defined differently, all terms used herein, which include technical terminologies or scientific terminologies, have the same meanings as those understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The technical solution of embodiments of the disclosure may be applied to various communication systems, for example, global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunication system (UMTS), worldwide interoperability for microwave access (WiMAX) communication system, 5th generation (5G) system or a new radio (NR), etc. Furthermore, the technical solution of the embodiments of the present application may be applied to future-oriented communication technologies.

FIG. 1 is a diagram illustrating a wireless network, according to an embodiment of the disclosure. The embodiment of a wireless network 100 shown in FIG. 1 is for illustrative purposes only. Other embodiments of the wireless network 100 may be used without departing from the scope of the disclosure.

The wireless network 100 includes a first gNodeB (gNB) 101, a second gNB 102, and a third gNB 103. The first gNB 101 communicates with the second gNB 102 and the third gNB 103. The first gNB 101 also communicates with at least one Internet protocol (IP) network 130, such as the Internet, a private IP network, or other data networks.

Depending on a type of the network, other well-known terms such as "base station" or "access point" may be used instead of "gNodeB" or "gNB". For convenience, the terms "gNodeB" and "gNB" are used herein to refer to network infrastructure components that provide wireless access for remote terminals. Depending on the type of the network, other well-known terms such as "mobile station", "user station", "remote terminal", "wireless terminal" or "user apparatus" may be used instead of "user equipment" or "UE". For convenience, the terms "user equipment" and "UE" are used herein to refer to remote wireless devices that wirelessly access the gNB, no matter whether the UE is a mobile device (e.g., a mobile phone or a smart phone) or a fixed device (e.g., a desktop computer or a vending machine).

The second gNB 102 provides wireless broadband access to the network 130 for a first plurality of UEs within a coverage area 120 of the second gNB 102. The first plurality of UEs include a first UE 111, which may be located in a small business (SB); a second UE 112, which may be located in an enterprise (E); a third UE 113, which may be located in a WiFi hotspot (HS); a fourth UE 114, which may be located in a first residence (R); a fifth UE 115, which may be located in a second residence (R); a sixth UE 116, which may be a mobile device (M), such as a cellular phone, a wireless laptop computer, a wireless PDA, etc. The third gNB 103 provides wireless broadband access to the network 130 for a second plurality of UEs within a coverage area 125 of the third gNB 103. The second plurality of UEs include the fifth UE 115 and the sixth UE 116. In some embodiments, one or more of gNBs 101-103 can communicate with each other and with UEs 111-116 using 5G, LTE, LTE-A, WiMAX, or other advanced wireless communication technologies.

The dashed lines show approximate ranges of the coverage areas 120 and 125, and the ranges are shown as approximate circles merely for illustrative and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the first gNB 101, the second gNB 102, and the third gNB 103 include a 2D antenna array as described in embodiments of the present disclosure. In some embodiments, one or more of the first gNB 101, the second gNB 102, and the third gNB 103 support codebook designs and structures for systems with 2D antenna arrays.

Although FIG. 1 illustrates an example of the wireless network 100, various changes can be made to FIG. 1. The wireless network 100 may include any number of gNBs and any number of UEs in any suitable arrangement, for example. Furthermore, the first gNB 101 may directly communicate with any number of UEs and provide wireless broadband access to the network 130 for those UEs. Similarly, each of the second and third gNBs 102-103 can directly communicate with the network 130 and provide direct wireless broadband access to the network 130 for the UEs. In addition, one or more of the first through third gNBs 101, 102 and/or 103 can provide access to other or additional external networks, such as external telephone networks or other types of data networks.

Figure 2A:
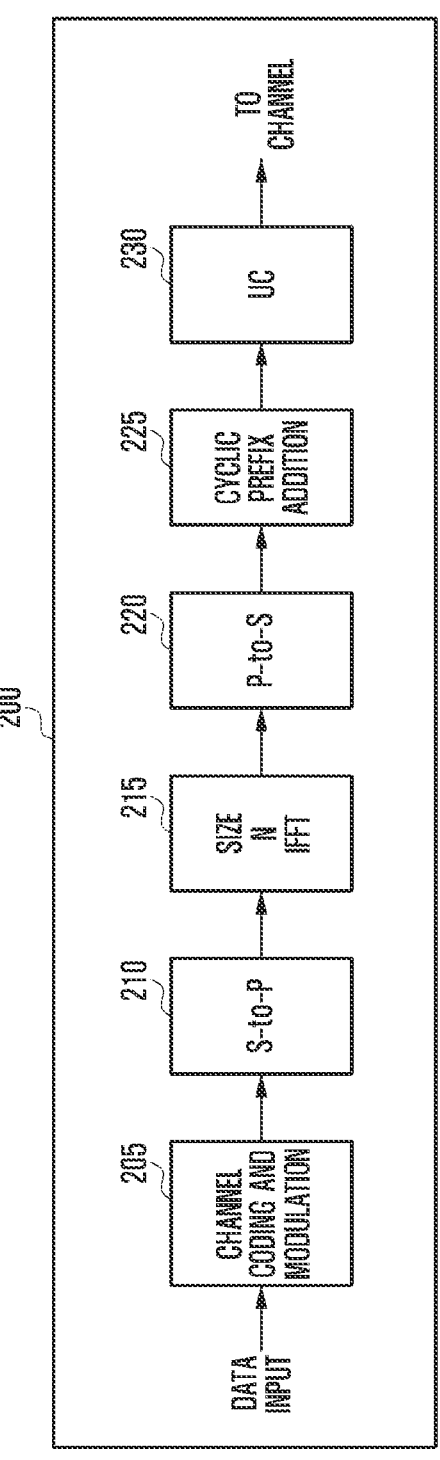
FIGS. 2A and 2B are diagrams illustrating wireless transmitting and receiving paths, according to an embodiment of the disclosure.
Figure 2B:
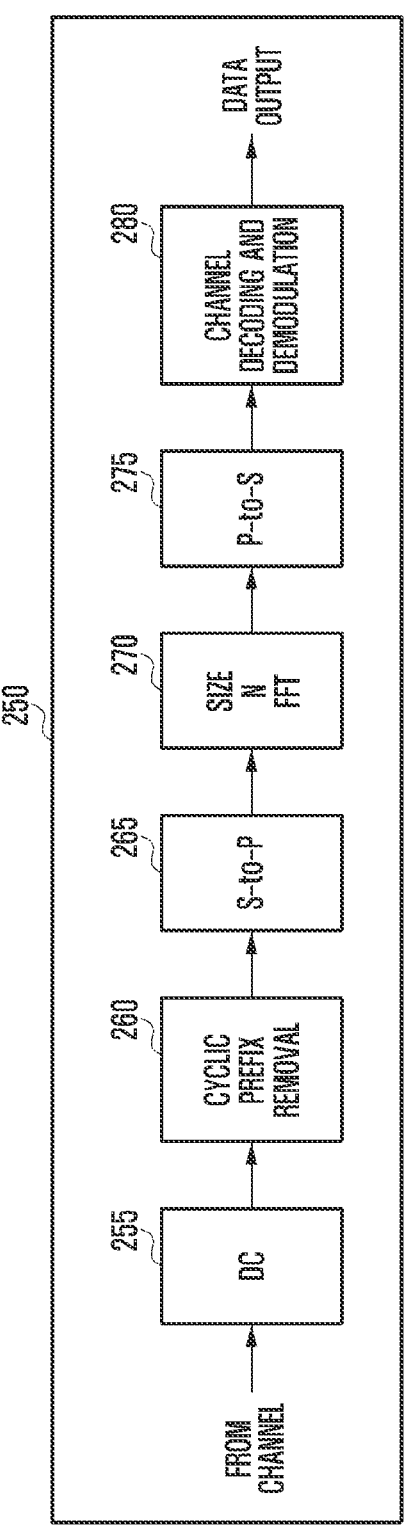

FIGS. 2A and 2B are diagrams illustrating wireless transmission and reception paths, according to an embodiment of the disclosure. Herein, a transmission path 200 may be described as being implemented in a gNB, such as the second gNB 102, and a reception path 250 may be described as being implemented in a UE, such as the sixth UE 116. However, it should be understood that the reception path 250 may be implemented in a gNB and the transmission path 200 may be implemented in a UR The reception path 250 may be configured to support codebook designs and structures for systems with 2D antenna arrays, as described herein.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (e.g., low density parity check (LDPC) coding), and modulates the input bits (e.g., using quadrature phase shift keying (QPSK) or quadrature amplitude modulation (QAM)) to generate a sequence of frequency-domain modulated symbols. The S-to-P block 210 converts (e.g., demultiplexes) serial modulated symbols into parallel data to generate N parallel symbol streams, where N is a size of the IFFT/FFT used in the second gNB 102 and the sixth UE 116. The size N IFFT block 215 performs IFFT operations on the N parallel symbol streams to generate a time-domain output signal. The P-to-S block 220 converts (e.g., multiplexes) parallel time-domain output symbols from the size N IFFT block 215 to generate a serial time-domain signal. The cyclic prefix addition block 225 inserts a cyclic prefix into the time-domain signal. The up-converter 230 modulates e.g., up-converts) the output of the cyclic prefix addition block 225 to an RF frequency for transmission via a wireless channel. The signal can also be filtered at a baseband before switching to the RF frequency.

The RF signal transmitted from the second gNB 102 arrives at the sixth UE 116 after passing through the wireless channel, and operations in reverse to those at the second gNB 102 are performed at the sixth UE 116. The down-converter 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of the first through third gNBs 101-103 may implement a transmission path 200 similar to that for transmitting to first through sixth UEs 111-116 in the downlink, and may implement a reception path 250 similar to that for receiving from UEs 111-116 in the uplink. Similarly, each of the first through sixth UEs 111-116 may implement a transmission path 200 for transmitting to the first through third gNBs 101-103 in the uplink, and may implement a reception path 250 for receiving from the first through third gNBs 101-103 in the downlink.

Each of the components in FIGS. 2A and 2B may be implemented using only hardware, or using a combination of hardware and software/firmware. For example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier Transform (IDFT) functions. It should be understood that for DFT and IDFT functions, the value of variable N may be any integer (e.g., 1, 2, 3, 4, etc.), while for FFT and IFFT functions, the value of variable N may be any integer which is a power of 2 (e.g., 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
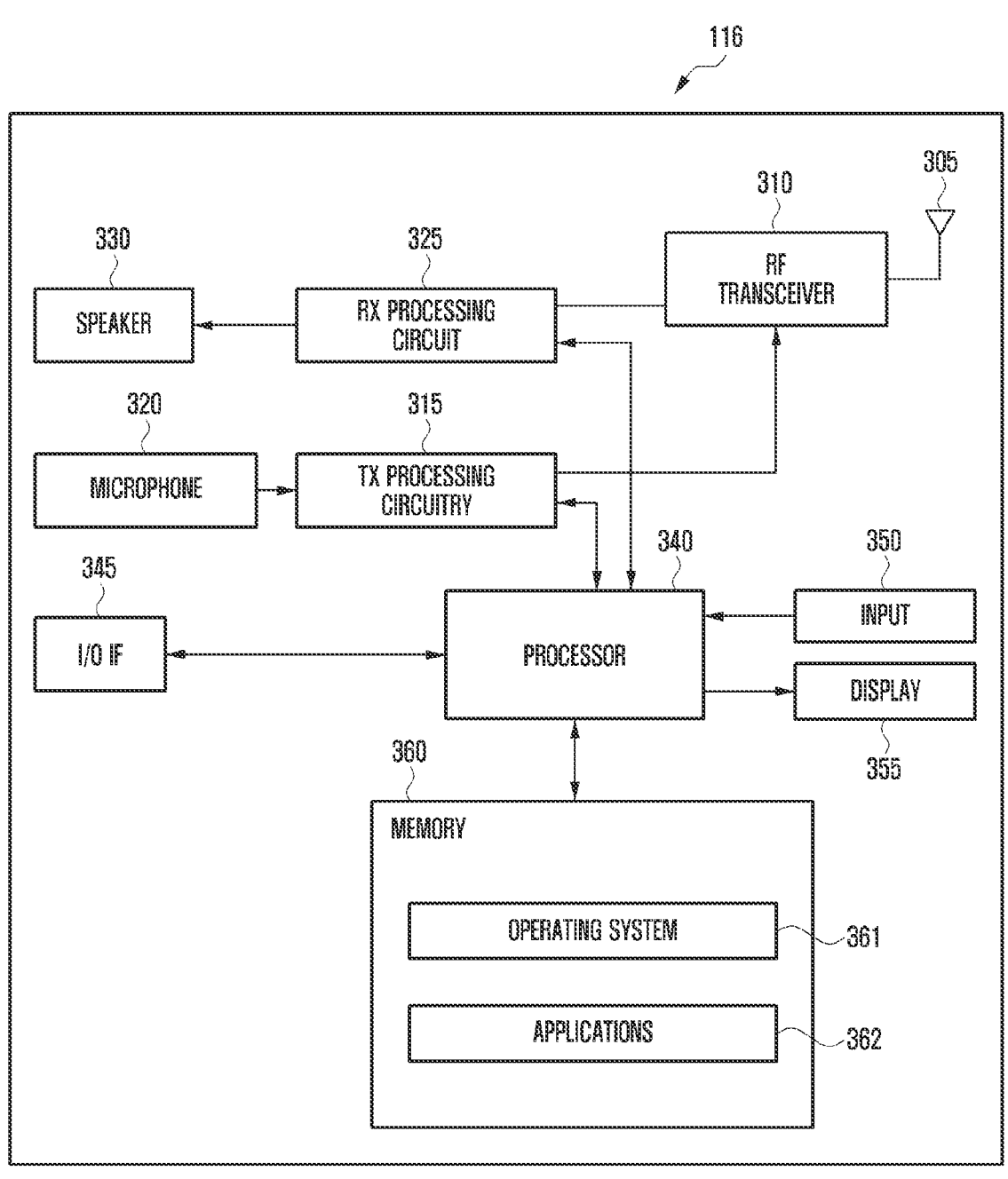
FIG. 3A is a diagram illustrating a UE, according to an embodiment of the disclosure.

FIG. 3A is a diagram illustrating a UE, according to an embodiment of the disclosure. The sixth UE 116 shown in FIG. 3A is for illustrative purposes only, and the first through fifth UEs 111-115 of FIG. 1 may have the same or a similar configuration. However, a UE has various configurations, and FIG. 3A does not limit the scope of the present disclosure to any specific implementation of the UE.

The sixth UE 116 includes an antenna 305, a radio frequency (RF) transceiver 310, a transmission (TX) processing circuit 315, a microphone 320, and a reception (RX) processing circuit 325. The sixth UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (e.g., for voice data) or to processor/controller 340 for further processing (e.g., for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315. The processor/controller 340 may include at least one microprocessor or microcontroller.

The processor/controller 340 is also capable of executing other processes and programs residing in the memory 360, such as operations for channel quality measurement and reporting for systems with 2D antenna arrays as described herein. The processor/controller 340 can move data into or out of the memory 360 as required by an execution process. The processor/controller 340 may be configured to execute the application 362 based on the OS 361 or in response to signals received from the gNB or the operator. The processor/controller 340 is also coupled to an I/O interface 345, where the I/O interface 345 provides the sixth UE 116 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of the sixth UE 116 can input data into the sixth UE 116 using the input device(s) 350. The display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3A illustrates an example of the sixth UE 116, various changes can be made to FIG. 3A. For example, various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Furthermore, although FIG. 3A illustrates that the sixth UE 116 is configured as a mobile phone or a smart phone, UEs can be configured to operate as other types of mobile or fixed devices.

Figure 3B:
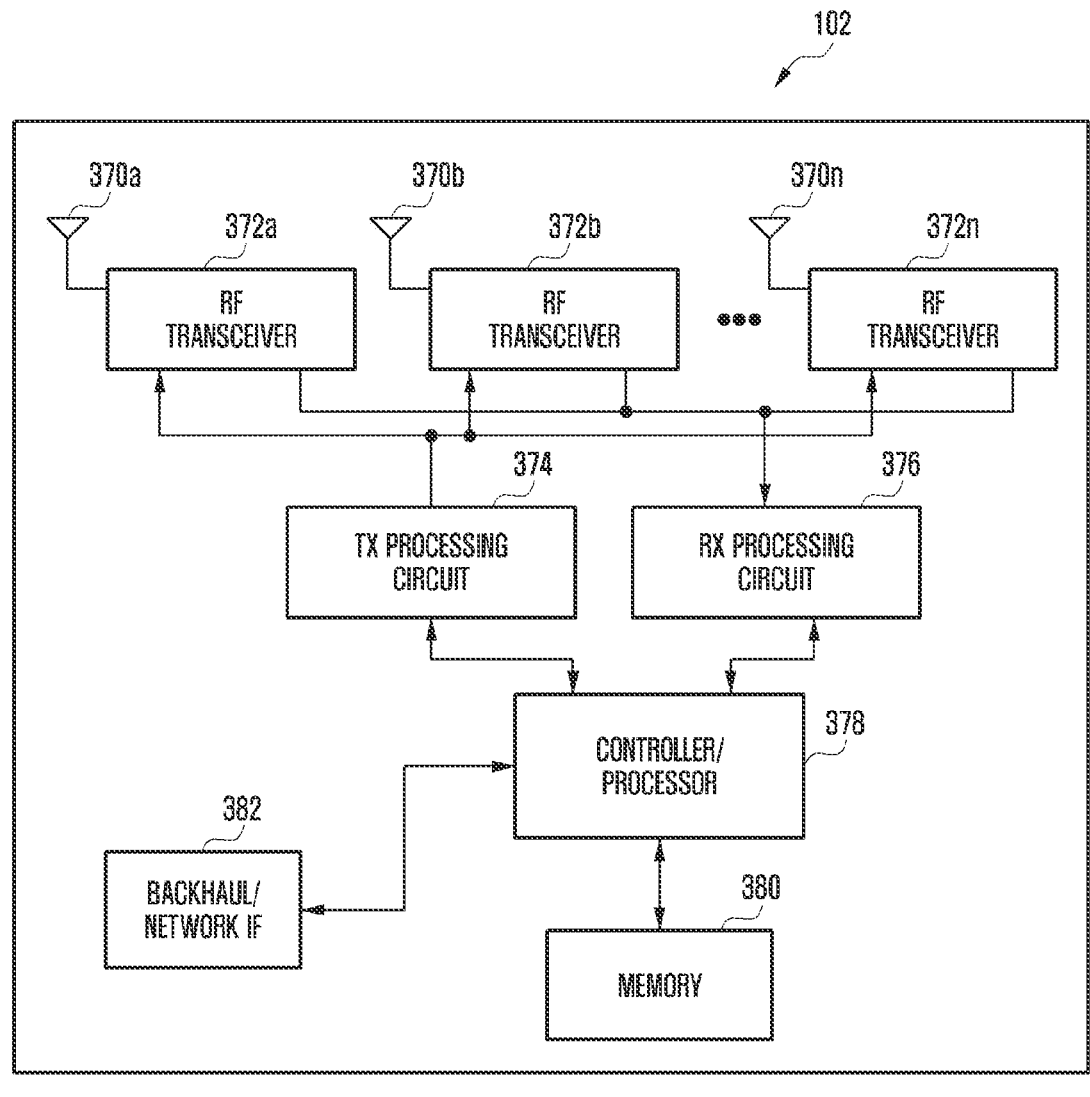
FIG. 3B is a diagram illustrating a gNB, according to an embodiment of the disclosure.

FIG. 3B is a diagram illustrating a gNB, according to an embodiment of the disclosure. The embodiment of the second gNB 102 shown in FIG. 3B is for illustrative purposes only, and other gNBs of FIG. 1 may have the same or a similar configuration. However, a gNB has various configurations, and FIG. 3B does not limit the scope of the present disclosure to any specific implementation of a gNB. It should be noted that the first gNB 101 and the second gNB 103 may include the same or similar structures as the second gNB 102.

As shown in FIG. 3B, the second gNB 102 includes a plurality of antennas 370a-370n, a plurality of RF transceivers 372a-372n, a transmission (TX) processing circuit 374, and a reception (RX) processing circuit 376. One or more of the plurality of antennas 370a-370n may include a 2D antenna array. The second gNB 102 also includes a controller/processor 378, a memory 380, and a backhaul or network interface 382.

The RF transceivers 372a-372n receive an incoming RF signal from the antennas 370a-370n, such as a signal transmitted by UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (e.g., voice data, network data, email or interactive video game data) from the controller/processor 378. The TX processing circuit 374 encodes, multiplexes, and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via the antennas 370a-370n.

The controller/processor 378 may include one or more processors or other processing devices that control the overall operation of the second gNB 102. For example, the controller/processor 378 can control the reception of forward channel signals and the transmission of backward channel signals through the RF transceivers 372a-372n, the RX processing circuit 376 and the TX processing circuit 374. The controller/processor 378 can also support additional functions, such as higher-level wireless communication functions. For example, the controller/processor 378 can perform a blink interference sensing (BIS) process such as that performed through a BIS algorithm, and decode a received signal from which an interference signal is subtracted. The controller/processor 378 may support any of a variety of other functions in the second gNB 102. The controller/processor 378 may include at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. The controller/processor 378 may support communication between entities such as web RTCs. The controller/processor 378 may move data into or out of the memory 380 as required by an execution process.

The controller/processor 378 is also coupled to the backhaul or network interface 382. The backhaul or network interface 382 allows the second gNB 102 to communicate with other devices or systems through a backhaul connection or through a network. The backhaul or network interface 382 can support communication over any suitable wired or wireless connection(s). For example, when the second gNB 102 is implemented as a part of a cellular communication system, such as a cellular communication system supporting 5G or new radio access technology or NR, LTE or LTE-A, the backhaul or network interface 382 may allow the second gNB 102 to communicate with other gNBs through wired or wireless backhaul connections. When the second gNB 102 is implemented as an access point, the backhaul or network interface 382 may allow the second gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 may include a RAM, while another part of the memory 380 can include a flash memory or other ROMs. A plurality of instructions, such as the BIS algorithm, may be stored in the memory. The plurality of instructions are configured to cause the controller/processor 378 to execute the BIS process and decode the received signal after subtracting at least one interference signal determined by the BIS algorithm.

As will be described in greater detail below, the transmission and reception paths of the second gNB 102 (implemented using the RE transceivers 372a-372n, the TX processing circuit 374 and/or the RX processing circuit 376) support aggregated communication with FDD cells and TDD cells.

Although FIG. 3B illustrates an example of the second gNB 102, various changes may be made to FIG. 3B. For example, the second gNB 102 may include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the second gNB 102 may include multiple instances of each (such as one for each RF transceiver).

A time domain unit (also referred to as a time unit) may be one orthogonal frequency-division multiplexing (OFDM) symbol, one OFDM symbol group (composed of multiple OFDM symbols), one slot, one slot group (composed of multiple slots), one subframe, one subframe group (composed of multiple subframes), one system frame, one system frame group (composed of multiple system frames); or may also be an absolute time unit, such as 1 millisecond, 1 second, etc.; the time unit may also be a combination of various granularities, for example n1 slots plus n2 OFDM symbols, wherein, n1 and n2 may be natural numbers.

A frequency domain unit (also referred to as a frequency unit) may be: one subcarrier, one subcarrier group (composed of multiple subcarriers), one resource block (RB), which can also be referred to as one physical resource block (PRB), one resource block group (composed of multiple RBs), one frequency band part (also known as the BWP), one frequency band part group (composed of multiple BWPs), one frequency band/carrier, one frequency band group/carrier group; or may also be an absolute frequency unit, such as 1 Hz, 1 kHz, etc.; the frequency domain unit may also be a combination of various granularities, for example, M1 PRBs plus the M2 subcarriers, wherein, M1 and M2 may be natural numbers.

Transmission links in a wireless communication system mainly include a downlink communication link from a 5G NR gNB to a UE, and an uplink communication link from a UE to a network.

Nodes for positioning measurement in wireless communication systems (e.g., a current wireless communication system) may include a UE for initiating a positioning request message, a location management function (LMF) for issuance of positioning assistance data and UE positioning, a gNB or a transmission-reception point (TRP) for broadcasting positioning assistance data and uplink positioning measurement, and a UE for downlink positioning measurement.

In a process of performing a positioning measurement, the transmitter transmits a reference signal for positioning, the receiver measures the reference signal for positioning, and calculates and reports a positioning measurement result, or the receiver reports assistance information to the transmitter, and the transmitter calculates the positioning measurement result. In order to provide positioning services with higher accuracy and low complexity, for example, a 99.9% user-level positioning accuracy of 0.3 m and a positioning latency of 15 ms, a positioning measurement error may be further reduced by using a carrier phase-based positioning measurement method. The carrier phase-based positioning measurement method implements positioning measurement by detecting a change (e.g., a difference value) between carrier phases of the transmitter and the receiver, where the difference value between the carrier phases of the transmitter and the receiver can be divided into two parts: an integer part carrier phase difference and a fractional part carrier phase difference (of a carrier period). When compared with a positioning measurement method using a reference signal receiving power (RSRP) of a beam to calculate an angle of arrival (AOA) and an angle of departure (AOD), the carrier phase-based positioning measurement method may usually obtain an azimuth AOA/a zenith angle of arrival (ZOA) and an azimuth AOD/a zenith angle of departure (ZOD) of a signal and/or location information of a user by directly calculating the change of the carrier phases, therefore, it is simpler than the original calculating method. However, considering that the reference signal for positioning is affected by a multi-path effect, Doppler frequency shift, and an interference of an adjacent cell in the propagation process, or by oscillator instability of the transmitter and/or receiver, the reference signal for positioning may have serious phase shift occur at the transmitter and/or receiver and, in extreme cases, will cause phase jumping (i.e., a cycle slip phenomenon). The above problems have brought about great difficulties in positioning measurement using the carrier phase, and how to implement a carrier phase-based positioning measurement in a rich-scattering environment and/or in the case where a terminal is moving is a problem that needs to be solved. Those skilled in the art should understand that, an angle mentioned throughout the present disclosure may include at least one of the AOA, the AOD, the azimuth AOA, the ZOA, the azimuth AOD, and the ZOD.

Figure 4:
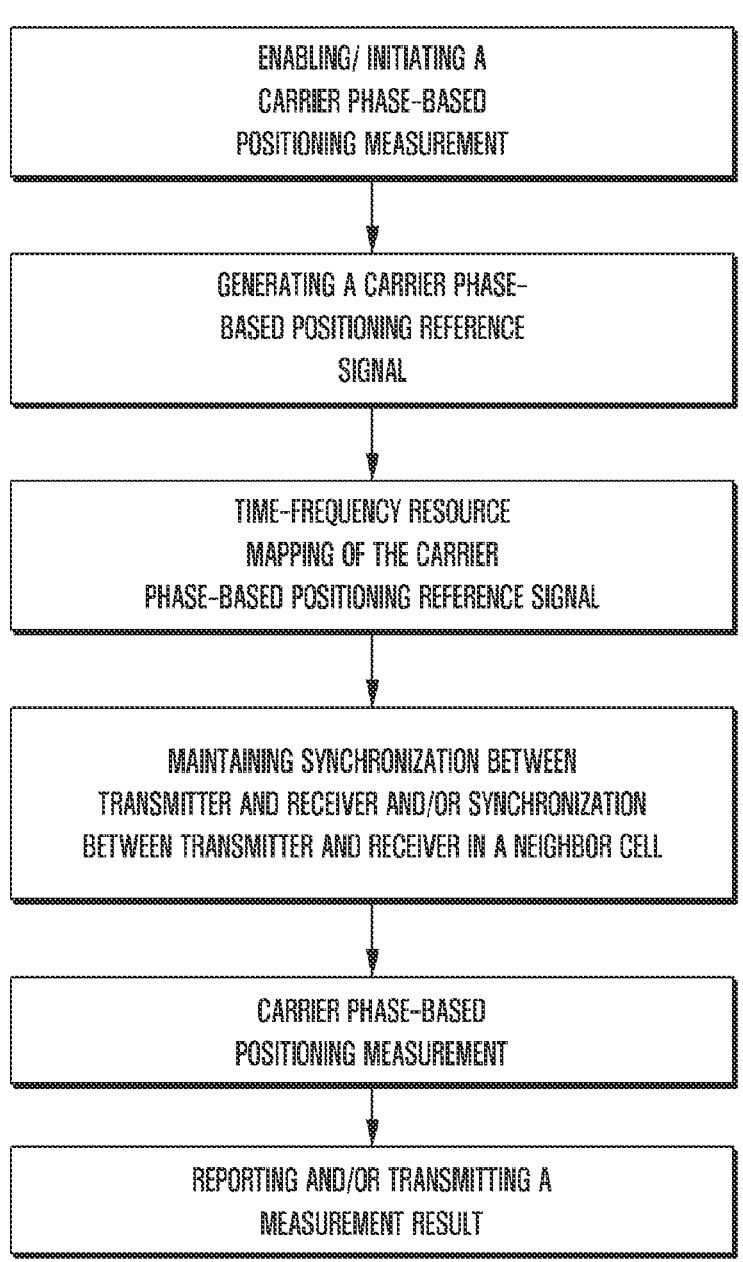
FIG. 4 is a diagram illustrating a measurement flowchart, according to an embodiment of the disclosure.

FIG. 4 is a flowchart illustrating a carrier phase-based positioning measurement method, according to an embodiment of the disclosure. Specifically, herein, a measurement method and device for signal will be introduced, including, such as, but not limited to, a measurement method and device of a carrier phase-based positioning reference signal. As shown in FIG. 4, six aspects of contents are introduced to implement the carrier phase-based positioning measurement: a condition for enabling/initiating the carrier phase-based positioning measurement method, a way for generating a carrier phase-based positioning reference signal, a way for mapping time-frequency resources of the carrier phase-based positioning reference signal, a method for maintaining a synchronization between the transmitter and the receiver and/or a synchronization between a transmitter and a receiver in a neighbor cell, a method for performing the carrier phase-based positioning measurement, and a method for reporting and/or transmitting measurement results. A method is introduced by using the carrier phase-based positioning reference signal as a non-limiting example of the reference signal for positioning, the method may also be used for measurements of other signals. Although FIG. 4 includes the above six aspects of contents, it should be understood by those skilled in the art that the various aspects are not necessary, and in some cases, some aspects may be omitted, and a desired result can still be achieved. Herein, taking the carrier phase-based positioning reference signal as an example for representing the reference signal for positioning, those skilled in the art should appreciate that the reference signal for positioning is not limited to the carrier phase-based positioning reference signal and may also include other positioning reference signals.

The method for enabling/initiating the carrier phase-based positioning measurement method may include a combination of one or more of the following items:

the receiver requests enabling/initiating the carrier phase-based positioning measurement method via a radio resource control (RRC) message or a media access control (MAC) control element (CE) message. Optionally, when a first condition is satisfied, the receiver requests for enabling/initiating the carrier phase-based positioning measurement method via the RRC message or the MAC CE message;

the transmitter enables/initiates the carrier phase-based positioning measurement method and configures a carrier phase-based positioning reference signal. Optionally, when the first condition is satisfied and/or after receiving a request from the receiver, the transmitter enables/initiates the carrier phase-based positioning measurement method and configures the carrier phase-based positioning reference signal;

optionally, the receiver may acquire corresponding configuration information by way of transmitting assistance information and/or directly requesting a required specific carrier phase-based positioning reference signal, which may be a carrier phase-based positioning reference signal having a specific period T or a specific frequency for a specific wavelength λ requested by the receiver in accordance with an antenna spacing of d selected by an adjacent or any receiver;

a optionally, the transmitter may configure the carrier phase-based positioning reference signal according to the configuration information of the specific carrier phase-based positioning reference signal requested by the receiver; and/or the transmitter transmits a list of supported configuration parameters of the carrier phase-based positioning reference signal to the receiver. The transmitter, according to one or more index numbers and/or various types of configuration parameters fed back from the receiver, randomly selects an index number and/or a type of configuration parameters, with equal probability. The type of configuration parameters may be configuration information of a carrier phase-based positioning reference signal of a specific period T or a specific frequency f or a specific wavelength λ. The transmitter may, according to the antenna spacing d selected from the adjacent or any receiver reported by the receiver, within the range of parameter configuration of the carrier phase-based positioning reference signal supported by the transmitter, randomly select a type of configuration parameters with equal probability. The type of configuration parameters may be the configuration information of the carrier phase-based positioning reference signal of a specific period T or a frequency for a wavelength λ;

the first condition may be at least one of the following items: the receiver and/or transmitter determines that the current positioning accuracy does not meet requirements by other ways, and/or a confidence of positioning reliability obtained by an existing positioning method is less than V (e.g., V=90%), and/or the receiver determines that the current positioning reliability does not meet the requirements and sends a positioning alert, and/or a RSRP value of the carrier phase-based positioning reference signal received by the receiver is less than a first threshold value N1, and/or a difference value between a measured AoA/ZoA and/or AoD/ZoD and a desired AoA/ZoA and/or AoD/ZoD is greater than a second threshold value N2, and/or a difference value between a measured reference signal time difference (RSTD) and a desired RSTD is greater than a third threshold value N3. The other ways may be determining, by a UE or a base station or an LMF or a sidelink device or a positioning reference unit (PRU) with a known location, that a difference value, in a horizontal direction and/or a vertical direction, between a measured location information and/or angle information of one or more UEs and an actual location information and/or angle information of the one or more UEs (which may be considered as the location coordinates and/or angle information of the device with the known location) is greater than a fourth threshold value N4;

a the specific period T needs to satisfy $3 \times 10^8 \times T$ is greater than or equal to twice the antenna spacing 2d, the specific frequency f needs to satisfy $3 \times 10^8/f$ is greater than or equal to twice the antenna spacing 2d, and the specific wavelength $\lambda$ needs to satisfy $\lambda$ is greater than or equal to twice the antenna spacing 2d;

the receiver and transmitter may be a UE or a base station or an LMF or a sidelink device (e.g., a device supporting the sidelink);

each of the first threshold value N1, the second threshold value N2, the third threshold value N3, the fourth threshold value N4, and V may be a parameter value reported by the UE depending on its own processing capacity and/or a parameter value configured by the base station and received by the UE and/or a preconfigured parameter. Among them, N1, N2, N3, N4, and V can be real numbers greater than 0.

In some implementations, the manner of generating the carrier phase-based positioning reference signal may comprise a combination of one or more of the following items:

the configuration information of the carrier phase-based positioning reference signal may include a period or a frequency or a wavelength of the signal. On different subcarriers and/or frequency bands, the transmitter may directly configure or configure depending on the request by the receiver, the carrier phase-based positioning reference signal with the same period or frequency or wavelength and/or different periods or frequencies or wavelengths. Optionally, the transmitter may configure a carrier phase-based positioning reference signal having the same period or frequency or wavelength on the adjacent subcarriers and/or frequency bands, simultaneously. The receiver utilizes a statistical method to process more than one measurement results of the carrier phase-based positioning reference signal, for example, taking the average and/or maximum of the more than one measurement results of the carrier phase-based positioning reference signal as the final measurement result, to reduce the influence of the multi-path effect, Doppler frequency shift and interference by an adjacent cell on the carrier phase of the received signal;

the carrier phase-based positioning reference signal can be generated based on the way for generating a phase tracking reference signal (PTRS), for example, the way for generating a carrier phase-based positioning reference signal is same as that for generating the PTRS. Optionally, the carrier phase-based positioning reference signal is generated using the way for generating a PTRS when transmission precoding is not enabled;

using a periodic signal to generate a single-carrier carrier phase-based positioning reference signal, comparing with a multi-carrier signal, the single-carrier signal has a higher receiving power and can better resist the multi-path effect and interference by the adjacent cell. For example, the periodic signal may include, but is not limited to, periodic sine, cosine, triangular, and square waves.

In some implementations, the manner of mapping the time-frequency resource of the carrier phase-based positioning reference signal may include a combination of one or more of the following items:

the carrier phase-based positioning reference signal can be mapped to a blank frequency band by a way for mapping time-frequency resource of the single-carrier and/or multi-carrier, to obtain continuous signal phase information. Considering that in the current wireless communication system, a cyclic prefix (CP) is usually added between OFDM symbols and a tail of a symbol sample is copied within the range of the cyclic prefix to reduce an inter-symbol interference. This operation causes a problem of discontinuity in the signal carrier phase. In order to obtain a continuous phase, the carrier phase-based positioning reference signal may be mapped onto the time-frequency resource where the guard interval and/or the center frequency is located. The blank frequency band refers to a frequency band with no signal transmission, for example, the frequency band where the guard interval and/or the center frequency is located.

the carrier phase-based positioning reference signal may be mapped onto OFDM symbols by the way for mapping time-frequency resource of a single-carrier and/or multi-carrier. In order to ensure the continuity of the signal carrier phase, cyclic prefixes are added normally only before the first OFDM symbol and after the last OFDM symbol of the time-frequency resource mapping location of the carrier phase-based positioning reference signal, and no cyclic prefix is added between the OFDM symbols of the time-frequency resource mapping location of the carrier phase-based positioning reference signal;

the carrier phase-based positioning reference signal may be mapped based on a way for mapping the time-frequency resource of the phase tracking reference signal (PTRS). For example, the way for mapping time-frequency resource of the carrier phase-based positioning reference signal may be the same as the way for mapping the time-frequency resource of the PTRS. The transmitter uses P continuous subcarriers in the frequency domain to transmit the carrier phase-based positioning reference signal, whose density or period or interval in the time domain is T. Optionally, depending on speed information reported by the receiver, the transmitter may configure different densities or periods or intervals of the carrier phase-based positioning reference signal in the time domain, to acquire the location information of the receiver faster and reduce the positioning latency, i.e.; the density or period or interval of the carrier phase-based positioning reference signal in the time domain may be configured depending on the moving speed of the receiver. Optionally, depending on the speed information reported by the receiver, the transmitter may configure different continuous subcarriers for transmitting the carrier phase-based positioning reference signals in the frequency domain, to resist the Doppler frequency shift, i.e., the continuous subcarrier occupied by the carrier phase-based positioning reference signal in the frequency domain may be configured depending on the moving speed of the receiver. Each of P and T may be a parameter value reported by the user equipment UE depending on its own processing capacity and/or a parameter value configured by the base station and received by the UE and/or a preconfigured parameter value, and the P and T may be a real number greater than or equal to 0.

In some implementations, the method for keeping the synchronization of the transmitter and the receiver and/or the synchronization of the transmitter and receiver in the neighbor cell may include a combination of one or more of the following items:

a the transmitter periodically and/or semi-statically and/or aperiodically broadcasts signals to other transmitters and/or receivers to ensure that a signal phase of a phase-locked loop at the receiver is synchronized with a signal phase at the transmitter. Optionally, the broadcasted signal may be a carrier phase-based. positioning reference signal or another reference signal for synchronization;

a optionally, another transmitter and/or receiver may, when satisfying the second condition, request the transmitter to transmit a specific synchronization signal, for calibrating the time synchronization and/or phase synchronization of the other transmitter and/or receiver with the current transmitter. The second condition may be at least one of: a time difference value between the other transmitter and/or receiver and absolute time sources (e.g., GNSS, GPS, etc.) is greater than a fifth threshold value N5, and/or a difference value between an actual location of a UE or a base station or a LMF or a sidelink device or a positioning reference unit with known location and a measurement value is greater than a sixth threshold value N6, and/or the cases of satisfying the first condition;

a Each of the fifth threshold value N5 and the sixth threshold value N6 may be a parameter value reported by the user equipment UE depending on its own processing capacity and/or a parameter value configured by the base station and received by the UE and/or a preconfigured parameter. N5 and N6 may be real numbers greater than 0.

In order to reduce a phase deviation of the reference signal for positioning caused by the effects of the multi-path effect, Doppler frequency shift and interference by the adjacent cell in the process of propagation, or reduce a phase shift of the reference signal for positioning caused by the instability of oscillators at the transmitter and/or receiver in the process of transmission and/or reception, and solve an integer ambiguity problem in the carrier phase-based positioning measurement method, the measurement flowchart of the carrier phase-based positioning measurement method may include a combination of one or more of the following items:

a the transmitter may further improve the positioning accuracy of the receiver by transmitting carrier phase-based positioning reference signals with the same and/ or different configurations at the same or different times, and/or same or different sub-carriers or frequency bands, and/or same or different beams, and/or the same or different antenna arrays to solve the integer ambiguity problem caused by the effects of the multi-path effect, Doppler frequency shift, and interference by adjacent cell. Optionally, the transmitter may transmit a carder phase-based positioning reference signal with the same configuration in different beam directions. The receiver measures the carrier phase-based positioning reference signal in the same reception beam direction multiple times, and acquires the final measurement result depending on the measurement results of the received first arrival path, and/or the strongest path, and/or the first detection path in the reception beam direction; and/or acquiring the final measurement result by a statistical method depending on the measurement values of the carrier phase-based positioning reference signal transmitted in the different transmission beam directions received in the reception beam direction. For example, by taking the average of the measurement results of the carrier phase-based positioning reference signals transmitted in the multiple different transmission beam directions, and/or taking the maximum or minimum value of the measurement results of the carrier phase-based positioning reference signals transmitted in the multiple different transmission beam directions, to solve the problem of the integer ambiguity problem caused by the effects of the multi-path effect, Doppler frequency shift and interference by adjacent cell;

a based on configuration parameters of the carrier phase-based positioning reference signal supported by the transmitter and/or the receiver, the transmitter may acquire the integer part phase difference between the receiver and the transmitter by a reference signal for positioning of the first wavelength or the first frequency or the first period. The first wavelength or the first period may be an arbitrary value between an intermediate value and the maximum value of the wavelengths or periods of the carrier phase-based positioning reference signal supported by the receiver, the first frequency may be an arbitrary value between the minimum value and the intermediate value of the frequency range of the carrier phase-based positioning reference signal supported by the receiver, and the reference signal for positioning having the first wavelength or the first frequency or the first period is less prone to the integer ambiguity problem but with poor positioning accuracy. Additionally, the transmitter and/or receiver may also acquire the integer part phase difference between the receiver and the transmitter by existing positioning measurement methods, such as TDOA, AOA, AOD, multi-round-trip time (RTT), etc. Optionally, a distance S between the receiver and the transmitter may be acquired by the existing positioning methods, when using the determined carrier phase-based positioning reference signal to perform positioning measurement, its integer ambiguity value equals to a value by rounding up $S/\lambda$, wherein $\lambda$ is the wavelength of the determined carrier phase-based positioning reference signal. On the basis of solving the integer ambiguity problem, based on the configuration parameters of the carrier phase-based positioning reference signal supported by the transmitter and/or the receiver, the transmitter may acquire a more accurate fractional part phase difference between the receiver and the transmitter by configuring a reference signal for positioning of a second wavelength or a second frequency or a second period. The second wavelength or the second period may be an arbitrary value between the minimum value and the intermediate value of the wavelengths or periods of the carrier phase-based positioning reference signal supported by the receiver, the second frequency may be an arbitrary value between the intermediate value and the maximum value of the frequency range of the carrier phase-based positioning reference signal supported by the receiver, and the reference signal for positioning having the second wavelength or the second frequency or the second period is more prone to the integer ambiguity problem but with higher positioning accuracy;

optionally, the same transmitter transmits reference signals for positioning with the same and/or different wavelengths or frequencies or periods on different antenna arrays by way of alternate and/or simultaneous transmissions in time domain, and the receiver calculates AOD/ZOD or AOA/ZOA by measuring a phase difference value between different transmitting antenna arrays or different receiving antenna arrays and/or measuring the phase difference value between different transmitting antenna arrays or different receiving antenna arrays multiple times. For example, AOD/ZOD of the transmitter equals arcsine $(\lambda\psi/2 \pi d)$, where $\lambda$ is the wavelength of the signal, $\psi$ is the phase difference value, $\pi$ is Pi, and d is the antenna spacing. In order to reduce interferences between the carrier phase-based positioning reference signals transmitted from different antenna arrays, if the transmitters simultaneously transmit reference signals for positioning with the same wavelength or frequency or period, they can be transmitted through different subcarriers in the same frequency band. For example, AOD/ZOD at the transmitter equals to arcsine $(\gamma\psi/2 \pi d)$, where $\gamma$ is the wavelength difference between reference signals for positioning with different wavelengths or frequencies or periods, $\psi$ is the phase difference value, $\pi$ is Pi, and d is the antenna spacing. When the AOD/ZOD is calculated by using the phase difference values between different antenna arrays obtained by multiple measurements, the unique AOD/ZOD of the transmitter antenna may be obtained by statistically averaging a plurality of AOD/ZODs.

In some implementations, the method for reporting and/or transmitting the results of the carrier phase-based positioning measurements can include a combination of one or more of the following items:

a the receiver directly reports to the transmitter with a location coordinate of the receiver obtained by measurement and calculation. Optionally, considering that the receiver may be in a moving state, the receiver may report to the transmitter an uncertainty range [0, R] of a location coordinate corresponding to a respective measurement latency. R may be a parameter value reported by the user equipment UE depending on its own processing capacity and/or a parameter value configured by the base station and received by the UE and/or a preconfigured parameter value and/or a parameter value calculated through the current moving speed. R may be a real number greater than 0;

a the receiver directly reports to the transmitter a distance, an angle and/or a relative location coordinate of the receiver relative to the transmitter obtained by measurement and calculation. Optionally, considering that the receiver may be in a moving state and the measurement latency of the receiver, the receiver may report to the transmitter a uncertainty range of distance [0,R1], a uncertainty range of angle [0,A] and/or a uncertainty range of relative location coordinates [0,R2] of the receiver relative to the transmitter corresponding to the respective measurement latency, so that the transmitter can determine whether the currently positioning accuracy of the measurement meets positioning requirements or not, or predict the position according to the reported uncertainty range, or adjust the parameter configurations of the carrier phase-based positioning reference signal. Each of R1, R2 and A may be a parameter value reported by the user equipment UE depending on its own processing capability and/or a parameter value configured by the base station and received by the UE and/or a preconfigured parameter value and/or a parameter value calculated by the current moving speed. R1, R2 and A may be real numbers greater than 0;

a the receiver reports to the transmitter a carrier phase and/or an angle (e.g., a AOA/ZOA, a AOD/ZOD) and/or the corresponding carrier phase uncertainty and/or angle uncertainty obtained by measurement and calculation, and the uncertainty range of the carrier phase may be [0, C], and the uncertainty range of the angle can be [0, A1] or A2 angle values. Each of C, A1 and A2 can be a parameter value reported by the user equipment UE depending on its own processing capability and/or a parameter value configured by the base station and received by UE and/or a preconfigured parameter value. C, A1, A2 can be real numbers greater than 0. Optionally, a resolution of the reported angle and/or the corresponding angle uncertainty may be L, that is, the reported angle and/or the corresponding angle uncertainty may be determined depending on the granularities of the expected AOA/ZOA and the corresponding uncertainty value, wherein, for example, L=0.1 degree;

the receiver reports to the transmitter a carrier phase difference and/or an angle difference (such as a AOA/ZOA difference, a AOD/ZOD difference) and/or the corresponding carrier phase difference uncertainty and/or angle uncertainty between two adjacent measurements in time domain and/or between the measurement results of two antennas with antenna spacing d selected by the receiver, the uncertainty range of the carrier phase difference can be [0, C1], and the uncertainty range of the angle can be [0, A3] or A4 angle values. For example, if the terminal is in a stationary or low-speed moving state, the angle obtained after performing positioning measurement at different times only changes slowly or does not change, so it is only necessary to report the angle difference between two measurements, and this operation can reduce the signaling overhead for reporting multiple measurements. Each of C1, A3 and A4 can be a parameter value reported by the user equipment UE depending on its own processing capability and/or a parameter value configured by the base station and received by the UE and/or a preconfigured parameter value. C1, A3 and A4 can be real numbers greater than 0;

a Each transmitter and/or receiver is supported to report A5 angle measurement values and/or C2 carrier phase differences at most, wherein a pair of reception and transmission beam index IDs have a uniquely determined association relation with the angle measurement value/carrier phase difference and/or a timestamp corresponding to the angle measurement value/carrier phase difference. The angle measurement value and/or carrier phase difference of the same carrier phase-based positioning reference signal resource associated with different transmitter beam indexes IDs and the same receiver beam index ID have different timestamps. Optionally, the same carrier phase-based positioning reference signal resource should report different timestamps based on different transmitter beam indexes IDs and the same receiver beam index (directions). The angle measurement values and/or carrier phase differences associated with the same receiver beam index and/or associated with the same transmitter should be limited to a first number N7. For example, for each transmitter, the receiver can receive signals from at most 24 beam directions in the same beam direction, that is, it can measure at most 24 carrier phase-based positioning reference signals, and report at most 24 angle measurement values and/or carrier phase differences. Depending on different beam directions of the transmitter, each reported angle measurement value and/or carrier phase difference has different timestamps. The first number N7 can be defined as an upper limit of the number of angle measurement values and/or carrier phase differences associated with the same transmitter or receiver beam index, that is, the maximum number of angle measurement values and/or carrier phase differences that can be associated with the same transmitter or receiver beam index. N7 can be a real number greater than 0. The first number N7 may be a parameter value reported by the user equipment UE depending on its own processing capability and/or a parameter value configured by the base station and received by UE and/or a preconfigured parameter value, and/or a parameter value left to the UE implementation;

a when the transmitter transmits the carrier phase-based positioning reference signal resources in W transmission beam directions, the angle measurement values and/or carrier phases of W1 first arrival paths and/or strongest paths and/or first detection paths are reported at most in the same reception beam direction, and/or the angle measurement values/angle differences and/or carrier phases and/or carrier phase differences of W1 first arrival paths and/or strongest paths and/or first detection paths are reported at most depending on measurements in different reception beam directions, the reported angle measurement values and/or carrier phases can be associated with a unique pair of reception and transmission beam index IDs, and the reported angle difference value and/or carrier phase difference can be associated with the determined two pairs of reception and transmission beam index IDs. For example, for the same transmitter, the receiver can receive at most W1 first arrival paths and/or strongest paths and/or first detection paths in different beam directions, so the receiver can at most report the angle measurement values and/or carrier phases of W1 first arrival paths and/or strongest paths and/or first detection paths. W1 may be a real number greater than 0. Optionally, W1 may be less than or equal to W, and W1 may be a parameter value reported by the user equipment UE depending on its own processing capability and/or a parameter value configured by the base station and received by the UE and/or a preconfigured parameter value and/or a parameter value left to the UE implementation;

a measured location coordinate/a uncertainty range of location coordinate, and/or a distance and an angle relative to the transmitter/a uncertainty range of the distance and angle relative to the transmitter, and/or a relative location coordinate/a uncertainty range of the relative location coordinate, and/or a carrier phase/an angle (e.g., a AOA/ZOA, a AOD/ZOD) and/or a uncertainty range of the carrier phase/a uncertainty range of the angle, and/or a carrier phase difference/an angle difference (e.g., a AOA/ZOA difference, a AOD/ZOD difference), and/or a uncertainty range of the carrier phase difference and/or an uncertainty range of the angle difference may be reported as assistance data. The LMF may instruct the base station to configure carrier phase-based positioning reference signals with different wavelengths or periods or frequencies for the user equipment UE, and/or configure different measurement periods, and/or instruct the UE to report different measurement values according to the above uncertainty ranges of reported by UE;

a Optionally, for the frequency range 1 (FR1), a reference point of an angle measurement value and/or a carrier phase difference should be an antenna connector of the receiver and/or the transmitter or a center of a given antenna array or an intersection of antenna bottom mounting surface with a central axis. For frequency range 2 (FR2), the angle measurement value and/or carrier phase difference should be measured based on a combined signal of antenna elements corresponding to a given receiver branch or a center position of a given receiver branch or a center beam direction of a given receiver branch;

a the receiver reports a measurement result of a reference signal for positioning having specific period/frequency/wavelength that is based on a request and/or configured by a base station, where the reported location coordinate/uncertainty range of the location coordinate, and/or distance and angle relative to the transmitter/uncertainty range of the distance and angle relative to the transmitter, and/or relative location coordinate/uncertainty range of the relative location coordinate, and/or carrier phase/angle (such as a AOA/ZOA, a AOD/ZOD) and/or uncertainty range of the carrier phase/uncertainty range of the angle, and/or carrier phase difference/angle difference (such as a AOA/ZOA difference, a AOD/ZOD difference), and/or uncertainty range of the carrier phase difference/uncertainty range of the angle difference has a determined association relation with an ID of the carrier phase-based positioning reference signal and/or an ID of a resource of the carrier phase-based positioning reference signal and/or an ID of a resource set of the carrier phase-based positioning reference signal and/or a beam/antenna ID of the receiver and the transmitter. The ID of the carrier phase-based positioning reference signal and the ID of the resource of the carrier phase-based positioning reference signal and the ID of the resource set of the carrier phase-based positioning reference signal can determine a unique carrier phase-based positioning reference signal. Optionally, by measuring the same carrier phase-based positioning reference signal on different receiver beams/antennas, a phase difference between the carrier phase-based positioning reference signals on different receiver beams/antennas (corresponding to the ID of different beam pairs/antenna pairs of transmitter and receiver) may be acquired, to acquire more accurate angle measurement values. The association relation should also be reported to the LMF, so that the network can know the measurement result reported by the receiver is obtained and measured by which receiver and transmitter beam/antenna on which carrier phase-based positioning reference signal, so as to determine the accuracy of the measurement result. The association relation may be indicated by an upper layer parameter, which may be an RRC message and a MAC CE message, but is not limited to these messages;

a the receiver and transmitter may be a UE or a base station or an LMF or a sidelink device (e.g., a device supporting the sidelink), and the base station may also be a sidelink device.

A UE, as used herein, may refer to any terminal having wireless communication capabilities, including but not limited to a mobile phone, a cellular phone, a smart phone, a personal digital assistant (PDA), a portable computer, an image capture device such as a digital camera, a gaming device, a music storage and playback device, and any portable unit or terminal having wireless communication capabilities, or an Internet facility that allows wireless Internet access and browsing, etc.

A BS or network device, as used herein, may refer to an eNB, an eNodeB, a NodeB or a base station transceiver (BTS) or a gNB, etc., depending on the technology and terminology used.

Memory may be of any type suitable for the technical environment herein, and may be implemented by using any suitable data memory technology, including but not limited to a semiconductor-based memory device, a magnetic memory device and system, an optical memory device and system, a fixed memory and a removable memory.

The processor may be of any type suitable for the technical environment herein, including but not limited to one or more of items below: a general purpose computer, a special purpose computer, a microprocessor, a digital signal processor (DSP), and a processor based on a multi-core processor architecture.

The above-described embodiments are not intended to limit the disclosure. Any modification, equivalent substitution, improvement, and the like, made within the spirit and principles of the present disclosure should be covered within the protection scope of the disclosure.

Those skilled in the art may understand that, the present disclosure includes devices for performing one or more of the operations described in the present application. These devices may be specially designed and fabricated for required purposes, or may also include those known devices in general purpose computers. These devices have computer programs stored therein; and these computer programs are selectively activated or reconfigured. Such a computer program may be stored in a device (e.g., a computer) readable medium or stored in any type of medium suitable for storing electronic instructions and respectively coupled to a bus; the computer readable medium includes, but is not limited to, any type of disk (including a floppy disk, a hard disk, an optical disk, a compact disk (CD)-ROM, and a magneto-optical disk), a ROM, a RAM, an erasable programmable ROM (EPROM); an electrically erasable programmable ROM (EEPROM), a flash memory, a magnetic card or an optical card. That is, a readable medium includes any medium that stores or transmits information in a form that may be read by a device (e.g., a computer).

Those skilled in the art may understand that, computer program instructions may be used to implement each block of these structural diagrams and/or block diagrams and/or flow diagrams, and combinations of blocks in these structural diagrams and/or block diagrams and/or flow diagrams. Those skilled in the art may understand that, these computer program instructions may be provided to a general-purpose computer, a professional computer or a processor of other programmable data processing methods to implement, so that solutions specified in a block or a plurality of blocks of the structural diagrams and/or block diagrams and/or flow diagrams disclosed by the present disclosure may be executed by a computer or a processor of other programmable data processing method.

Those skilled in the art may recognize that, the disclosure may be implemented in other specific forms without changing the technical idea or essential features of the present disclosure. Therefore, it should be understood that, the above-described embodiments are merely examples and are not limited. The scope of the disclosure is defined by the appended claims, rather than detailed description. Therefore, it should be understood that, all modifications or changes derived from the meaning and scope of the appended claims and equivalents thereof are within the scope of the present disclosure.

In the above-described embodiments of the disclosure, all operations and steps may be selectively performed or may be omitted. Furthermore, operations and steps in each embodiment need not be performed sequentially, and the order of operations and steps may vary.

Although the disclosure has been illustrated and described with reference to various embodiments, those skilled in the art will understand that various changes may be made in form and detail without departing from the spirit and scope of the disclosure as defined by the appended claims and equivalents thereof.

What is claimed is:

1. A method performed by a user equipment (UE) in a communication system, the method comprising:
receiving configuration information associated with at least one positioning reference signal (PRS);
receiving the at least one PRS;
obtaining a carrier phase-based positioning measurement based on the at least one PRS; and
transmitting information associated with the carrier phase-based positioning measurement,
wherein the information associated with the carrier phase-based positioning measurement includes:
uncertainty information indicating a first value for uncertainty of the carrier phase-based positioning measurement, and
resolution information indicating a second value of degrees for resolution corresponding to the uncertainty information.

2. The method of claim 1, wherein the first value is indicated from values in a predefined range of [0, C], where C is a real number greater than 0, and
wherein the second value is 0.1.

3. The method of claim 1, wherein the information associated with the carrier phase-based positioning measurement includes timestamp information indicating a timestamp associated with the carrier phase-based positioning measurement.

4. The method of claim 1, wherein the carrier phase-based positioning measurement corresponds to a carrier phase measured based on the at least one PRS or a carrier phase difference between carrier phases measured based on the at least one PRS.

5. A user equipment (UE) in a communication system, the UE comprising:
    a transceiver; and
    a processor coupled with the processor and configured to:
        receive configuration information associated with at least one positioning reference signal (PRS) resource configuration,
        receive the at least one PRS,
        obtain a carrier phase-based positioning measurement based on the at least one PRS, and
        transmit information associated with the carrier phase-based positioning measurement,
    wherein the information associated with the carrier phase-based positioning measurement includes:
    uncertainty information indicating a first value for uncertainty of the carrier phase-based positioning measurement, and
    resolution information indicating a second value of degrees for resolution corresponding to the uncertainty information.

6. The UE of claim 5, wherein the first value is indicated from values in a predefined range of [0, C], where C is a real number greater than 0, and
    wherein the second value is 0.1.

7. The UE of claim 5, wherein the information associated with the carrier phase-based positioning measurement includes timestamp information indicating a timestamp associated with the carrier phase-based positioning measurement.

8. The UE of claim 5, wherein the carrier phase-based positioning measurement corresponds to a carrier phase measured based on the at least one PRS or a carrier phase difference between carrier phases measured based on the at least one PRS.

9. A method performed by a base station in a communication system, the method comprising:
    transmitting configuration information associated with at least one positioning reference signal (PRS) resource configuration;
    transmitting the at least one PRS; and
    receiving information associated with a carrier phase-based positioning measurement associated with the at least one PRS,
    wherein the carrier phase-based positioning measurement is associated with the at least one PRS, and
    wherein the information associated with the carrier phase-based positioning measurement includes:
    uncertainty information indicating a first value for uncertainty of the carrier phase-based positioning measurement, and resolution information indicating a second value of degrees for resolution corresponding to the uncertainty information.

10. The method of claim 9, wherein the first value is indicated from values in a predefined range of [0, C], where C is a real number greater than 0, and
    wherein the second value is 0.1.

11. The method of claim 9, wherein the information associated with the carrier phase-based positioning measurement includes timestamp information indicating a timestamp associated with the carrier phase-based positioning measurement.

12. The method of claim 9, wherein the carrier phase-based positioning measurement corresponds to a carrier phase measured based on the at least one PRS or a carrier phase difference between carrier phases measured based on the at least one PRS.

13. A base station in a communication system, the base station comprising:
    a transceiver; and
    a processor coupled with the processor and configured to:
        transmit configuration information associated with at least one positioning reference signal (PRS),
        transmit the at least one PRS, and
        receive information associated with a carrier phase-based positioning measurement associated with the at least one PRS,
    wherein the carrier phase-based positioning measurement is associated with the at least one PRS, and
    wherein the information associated with the carrier phase-based positioning measurement includes:
    uncertainty information indicating a first value for uncertainty of the carrier phase-based positioning measurement, and
    resolution information indicating a second value of degrees for resolution corresponding to the uncertainty information.

14. The base station of claim 13, wherein the first value is indicated from values in a predefined range of [0, C], where C is a real number greater than 0, and
    wherein the second value is 0.1.

15. The base station of claim 13, wherein the information associated with the carrier phase-based positioning measurement includes timestamp information indicating a timestamp associated with the carrier phase-based positioning measurement.

16. The base station of claim 13, wherein the carrier phase-based positioning measurement corresponds to a carrier phase measured based on the at least one PRS or a carrier phase difference between carrier phases measured based on the at least one PRS.

* * * * *